US012562404B2

(12) United States Patent (10) Patent No.: US 12,562,404 B2
Fujiyoshi (45) Date of Patent: Feb. 24, 2026

(54) METHOD FOR MANUFACTURING ALKALINE DRY BATTERY, AND ALKALINE DRY BATTERY

(71) Applicant: Panasonic Intellectual Property Management Co., Ltd., Osaka (JP)

(72) Inventor: Satoshi Fujiyoshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 513 days.

(21) Appl. No.: 18/032,265

(22) PCT Filed: Nov. 4, 2021

(86) PCT No.: PCT/JP2021/040488
§ 371 (c)(1),
(2) Date: Apr. 17, 2023

(87) PCT Pub. No.: WO2022/113675
PCT Pub. Date: Jun. 2, 2022

(65) Prior Publication Data
US 2023/0402656 A1 Dec. 14, 2023

(30) Foreign Application Priority Data
Nov. 27, 2020 (JP) ................................. 2020-197618

(51) Int. Cl.
*H01M 10/28* (2006.01)
*H01M 10/04* (2006.01)
(Continued)

(52) U.S. Cl.
CPC ....... *H01M 10/288* (2013.01); *H01M 10/049* (2013.01); *H01M 50/107* (2021.01); *H01M 50/186* (2021.01)

(58) Field of Classification Search
CPC ............. H01M 10/288; H01M 10/049; H01M 50/107; H01M 50/186; H01M 4/06; H01M 6/02; H01M 6/08
See application file for complete search history.

(56) References Cited

U.S. PATENT DOCUMENTS

2006/0257728 A1* 11/2006 Mortensen .......... H01M 50/446
429/251
2009/0274957 A1* 11/2009 Goda .................... B21C 23/186
72/348

(Continued)

FOREIGN PATENT DOCUMENTS

JP 2017-068905 4/2017
JP 2019-061801 4/2019

OTHER PUBLICATIONS

International Search Report of PCT application No. PCT/JP2021/040488 dated Dec. 28, 2021.

Primary Examiner — Stewart A Fraser
(74) Attorney, Agent, or Firm — Rimon P.C.

(57) ABSTRACT
A method for manufacturing an alkaline dry battery includes first to third steps. In the first step, a hollow cylindrical first positive electrode pellet including a first end face and a second end face is prepared in an axial direction is prepared. In the second step, a hollow cylindrical positive electrode pellet group including the first positive electrode pellet is inserted into a case to obtain a positive electrode inscribed in the case. At this time, the first positive electrode pellet is disposed on the most opening side of the case such that the first end face faces an opening side of the case. In the third step, an annular groove is provided in a side part of the case. The first positive electrode pellet includes a tapered part whose outer diameter decreases from the second end face toward the first end face, and in a cross section along the axial direction of the first positive electrode pellet, an (Continued)

inclination angle $\theta$ of the tapered part with respect to an axis of the first positive electrode pellet ranges from 0.26° to 0.87°, inclusive. A distance h between the groove and the first end face ranges from 0.55 mm to 2.35 mm, inclusive.

5 Claims, 7 Drawing Sheets

(51) Int. Cl.
    *H01M 50/107*     (2021.01)
    *H01M 50/186*     (2021.01)

(56)                References Cited

U.S. PATENT DOCUMENTS

2013/0065096 A1*   3/2013  Daniel-Ivad  ......  H01M 50/3425
                                          429/61
2018/0241012 A1*   8/2018  Ue  ........................  H01M 50/30

* cited by examiner

METHOD FOR MANUFACTURING ALKALINE DRY BATTERY, AND ALKALINE DRY BATTERY

TECHNICAL FIELD

The present invention relates to a method for manufacturing an alkaline dry battery and an alkaline dry battery.

BACKGROUND ART

An alkaline dry battery (alkaline manganese dry battery) is widely used because it has a large capacity and can take out a large current. In a positive electrode of the alkaline dry battery, a plurality of hollow cylindrical pellets containing manganese dioxide are stacked to form the positive electrode (PTLs 1 and 2, etc.). In a method for manufacturing an alkaline dry battery, a plurality of pellets containing a positive electrode active material (manganese dioxide) are inserted into a case and stacked to obtain a hollow cylindrical positive electrode inscribed in the case, and then an annular groove is provided in a region on an opening side of the positive electrode on a side part of the case.

CITATION LIST

Patent Literature

PTL 1: Unexamined Japanese Patent Publication No. 2017-68905

PTL 2: Unexamined Japanese Patent Publication No. 2019-61801

SUMMARY OF THE INVENTION

In order to increase the capacity, it is conceivable to increase a filling height (axial height dimension) of the positive electrode. However, when the filling height of the positive electrode is increased, a distance between the groove and an end face of the positive electrode on the opening side of the case becomes small, an impact at the time of forming the groove is easily transmitted to an end of the positive electrode on the opening side of the case, and cracking may occur at the end of the positive electrode on the opening side of the case.

An aspect of the present invention relates to a method for manufacturing an alkaline dry battery, the method including: a first step of preparing a hollow cylindrical first positive electrode pellet including a first end face in an axial direction and a second end face opposite to the first end face; a second step of inserting a hollow cylindrical positive electrode pellet group including the first positive electrode pellet into a bottomed cylindrical case to obtain a hollow cylindrical positive electrode inscribed in the case; and a third step of providing an annular groove in a region of a side part of the case on an opening side with respect to the positive electrode, in which the first positive electrode pellet includes a tapered part whose outer diameter decreases from the second end face toward the first end face, and in a cross section along the axial direction of the first positive electrode pellet, an inclination angle θ of the tapered part with respect to an axis of the first positive electrode pellet ranges from 0.26° to 0.87°, inclusive, in the second step, the first positive electrode pellet is disposed closest to the opening side of the case, the first end face facing the opening side of the case, and a distance h between the groove and the first end fam ranges from 0.55 mm to 2.35 mm, inclusive.

Another aspect of the present invention relates to an alkaline dry battery including: a bottomed cylindrical case including a groove; a hollow cylindrical positive electrode inscribed in the case in a region on a bottom side of the groove of the case; a negative electrode disposed in a hollow portion of the positive electrode; a separator disposed between the positive electrode and the negative electrode; an electrolyte solution; and a sealing unit disposed on a stepped part provided by the groove of the case and sealing an opening of the case, in which a distance h between the groove and an end fam of the positive electrode on a groove side ranges from 0.55 mm to 2.35 mm, inclusive, and when the alkaline dry battery is disassembled to expose the positive electrode from the case to an outside, the positive electrode includes a tapered part whose outer diameter decreases from the bottom side of the case toward the groove side, and in a cross section along an axial direction of the positive electrode, an inclination angle θ of the tapered part with respect to an axis of the positive electrode ranges from 0.26° to 0.87°, inclusive.

According to the present invention, itis possible to suppress the occurrence of cracking of the positive electrode at the time of forming the groove of the case while increasing a filling volume of the positive electrode.

DESCRIPTION OF EMBODIMENT

[Method for Manufacturing Alkaline Dry Battery]

Figure 1:
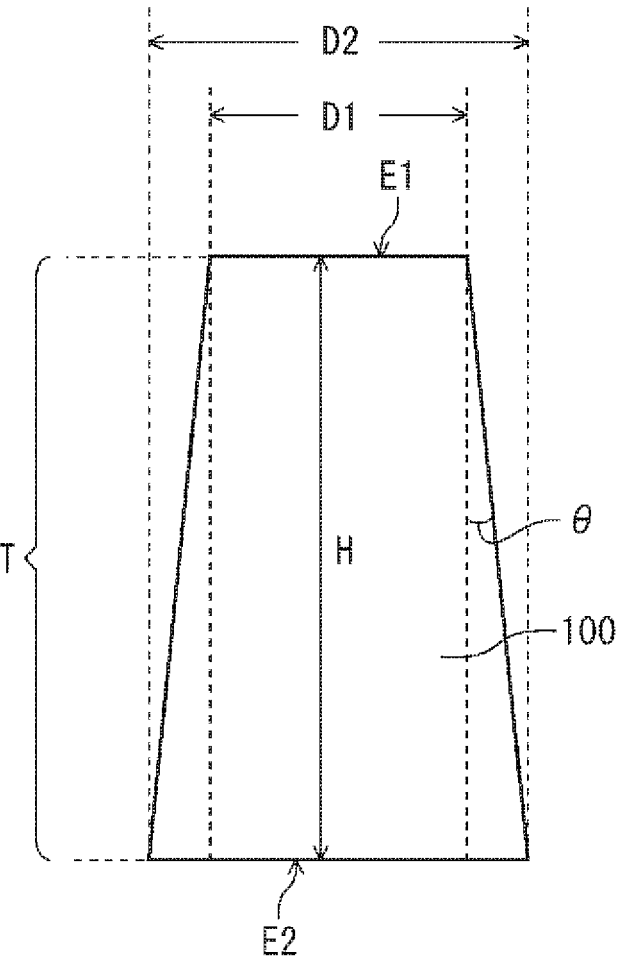
FIG. 1 is a schematic side view illustrating an example of a first positive electrode pellet obtained by a first step of a method for manufacturing an alkaline dry battery according to an exemplary embodiment of the present invention.

A method for manufacturing an alkaline dry battery according to an exemplary embodiment of the present invention includes the following first to third steps. The first step is a step of preparing a first positive electrode pellet. The second step is a step of inserting a hollow cylindrical positive electrode pellet group including the first positive electrode pellet into a bottomed cylindrical case to obtain a hollow cylindrical positive electrode inscribed in the case. The third step is a step of providing an annular groove in a region of a side part of the case near an opening with respect to the positive electrode. The first positive electrode pellet has a hollow cylindrical shape, and includes a first end face along an axis and a second end face opposite to the first end face.

The first positive electrode pellet includes a tapered part whose outer diameter decreases from the second end face toward the first end face. In a cross section along the axis of the first positive electrode pellet (when the first positive electrode pellet is viewed from a side surface), an inclination angle (Hereinafter, the inclination angle is also referred to as an "inclination angle $\theta$".) of the tapered part with respect to an axis of the first positive electrode pellet ranges from 0.26° to 0.87, inclusive. In the second step, the first positive electrode pellet is disposed closest to the opening of the case such that the first end face faces the opening of the case. A distance (Hereinafter, the distance is also referred to as a "distance h".) between the groove (a virtual plane including a part (deepest part) where a depth of the annular groove is the largest) and the first end face ranges from 0.55 mm to 2.35 mm, inclusive. Note that the distance h can be rephrased as a height of the deepest part of the groove from the first end face along the axis of the first positive electrode pellet.

In a case where the inclination angle $\theta$ and the distance h are each within the above ranges, it is possible to suppress the occurrence of cracking of the positive electrode at the time of forming the groove while increasing a filling height (height dimension in the axis) of the positive electrode to increase the capacity. Note that the above mentioned cracking refers to a phenomenon in which a crack is generated inside from a peripheral part of an end face of the positive electrode near the opening of the case (a first end face of the first pellet) due to an impact when the groove is provided in the case in the third step. A conductive path is cut by the cracking, and accordingly, a part that does not contribute to a discharge reaction is formed, and the discharge performance may be deteriorated.

In the second step, the first positive electrode pellet is press-fitted into the case and is brought into close contact with an inner surface of the case. At this time, the inclination angle $\theta$ is as small as 0.87° or less, and the first positive electrode pellet is slightly deformed by insertion into the case and swelled by absorption of an electrolyte solution, so that the tapered part is also in close contact with or in contact with the inner surface of the case to some extent. In a case where the inclination angle $\theta$ is 0.26° or more, the degree of close contact between the tapered part (the end of the positive electrode near the opening of the case) and the inner surface of the case is appropriately reduced, and impact transmitted to the tapered part (the end of the positive electrode near the opening of the case) at the time of forming the groove is reduced Therefore, even when the filling height of the positive electrode is increased and the distance h is reduced to 2.35 mm or less, the occurrence of cracking of the positive electrode can be suppressed. However, when the distance his smaller than 0.55 mm, cracking may occurring the positive electrode during form of the groove even when the inclination angle $\theta$ is 0.260 or more.

In a case where the inclination angle $\theta$ is less than 0.26°, when the distance h decreases to 2.35 mm or less, the probability that cracking occurs in the positive electrode during form of the groove remarkably increases. On the other hand, in a case where the inclination angle $\theta$ is more than 0.87° and/or the distance h is more than 2.35 mm, the filing volume of the positive electrode may be reduced.

From the viewpoint of easily increasing the filling volume of the positive electrode while suppressing cracking of the positive electrode, the inclination angle $\theta$ preferably ranges from 0.26° to 0.52°, inclusive. Similarly, the distance h preferably ranges from 0.55 mm to 1.35 mm, inclusive.

A value obtained by subtracting a case inner diameter from a maximum outer diameter of the first positive electrode pellet preferably ranges from 0 mm to 0.06 mm, inclusive. Note that the maximum outer diameter of the first positive electrode pellet refers to a dimension of a maximum outer diameter of the first pellet before the first pellet is inserted into the case. For example, when the first positive electrode pellet is a first pellet illustrated in FIG. 1 or 2, the outer diameter D2 in FIGS. 1 and 2 corresponds to the maximum outer diameter. Furthermore, the case inner diameter refers to a dimension of a case inner diameter before the positive electrode pellet group is inserted into the case. These values may be measured by cutting the case of the finished battery using, for example, a laser and separating the first positive electrode pellet and the case.

In a case where the value obtained by subtracting the case inner diameter from the maximum outer diameter of the first positive electrode pellet is 0 mm or more, good adhesion is easily obtained between the positive electrode and the case. In a case where the value obtained by subtracting the case inner diameter from the maximum outer diameter of the first positive electrode pellet is 0.06 mm or less, the occurrence of a crack in the positive electrode is suppressed. Here, the crack refers to a phenomenon in which a peripheral edge of the end face of the positive electrode near the opening of the case (the first end face of the first positive electrode pellet) is thinly peeled in a ring shape. The crack itself has little influence on the discharge performance, but may be a factor of occurrence of cracking of the positive electrode in a subsequent step.

From the viewpoint of suppressing cracking of the positive electrode, the tapered part is not necessarily provided on the entire side surface from the first end face to the second end face of the first positive electrode pellet. The tapered part may be provided in aside surface region from the first end face to a middle of the first end face and the second end face of the first positive electrode pellet. The tapered part is preferably provided along the entire circumference of the side surface of the first positive electrode pellet, and more preferably provided on the entire side surface from the first end face to the second end face of the first positive electrode pellet.

In across section along the axis of the first positive electrode pellet (as viewed from the side surface of the first positive electrode pellet), the contour of the tapered part may be linear or may be curved such as a slightly expanded arc. In the case of the curved shape, the inclination angle $\theta$ refers to an angle formed by a line segment (chord) connecting both ends of the curve (arc) and the axis of the first positive electrode pellet.

(First Step)

The first positive electrode pellet can be produced, for example, by pressure-molding a positive electrode mixture containing a positive electrode active material, a conductive agent, and an electrolyte solution into a desired shape. The positive electrode mixture may be once formed into a flake shape or a granular shape, classified as necessary, and then pressure-molded. The manganese dioxide density in the first positive electrode pellet can be adjusted by adjusting the pressure of the pressure molding.

The positive electrode active material contains manganese dioxide. The manganese dioxide is preferably electrolytic manganese dioxide. The manganese dioxide is used in the form of a powder. From the viewpoint of easily securing the filling property of the positive electrode, the diffusibility of the electrolyte solution in the positive electrode, and the like, an average particle diameter (D50) of manganese dioxide ranges, for example, from 20 μm to 60 μm, inclusive. From the viewpoint of moldability and suppression of expansion of the positive electrode, a BET specific surface area of manganese dioxide may be, for example, in the range from 15 $m^2$/g to 50 $m^2$/g, inclusive. An average density of manganese dioxide in the first positive electrode pellet ranges, for example, from 2.78 $g/cm^3$ to 3.08 $g/cm^3$, inclusive.

Note that, in the present specification, the average particle diameter (D50) is a median diameter in a volume-based particle size distribution. The average particle diameter is determined using, for example, a laser diffraction and/or scattering type particle size distribution measurement device. Furthermore, the BET specific surface area is obtained by measuring and calculating a surface area using the BET equation which is a theoretical equation of multimolecular layer adsorption. The BET specific surface area can be measured, for example, by using a specific surface area measurement device by a nitrogen adsorption method.

Examples of the conductive agent include carbon black such as acetylene black, and conductive carbon materials such as graphite. As the graphite, natural graphite, artificial graphite, and the like can be used. The conductive agent may be in a fibrous form or the like, but is preferably in a powder form. The average particle diameter (D50) of the conductive agent can be selected from, for example, a range from 5 nm to 50 μm, inclusive. The average particle diameter (D50) of the conductive agent preferably ranges from 5 nm to 40 nm, inclusive in a case where the conductive agent is carbon black, and preferably ranges from 3 μm to 50 μm, inclusive in a case where the conductive agent is graphite. The content of the conductive agent in the positive electrode mixture ranges, for example, from 3 parts by mass to 10 parts by mass, inclusive, and preferably from 4 parts by mass to 8 parts by mass, inclusive, relative to 100 parts by mass of manganese dioxide.

As the electrolyte solution, for example, an alkaline aqueous solution containing potassium hydroxide is used. The concentration of potassium hydroxide in the electrolyte solution ranges, for example, from 30 mass % to 50 mass %, inclusive. The electrolyte solution may further contain zinc oxide. The concentration of zinc oxide in the electrolyte solution ranges, for example, from 1% by mass to 5% by mass, inclusive. The content of the electrolyte solution in the positive electrode mixture ranges, for example, from 4 parts by mass to 15 parts by mass, inclusive, relative to 100 parts by mass of manganese dioxide.

The positive electrode mixture may further contain an additive. As the additive, for example, polyethylene or polytetrafluoroethylene can be used in addition to polyacrylic acid. The content of the additive in the positive electrode mixture ranges, for example, from 0.1 parts by mass to 1.0 parts by mass, inclusive, relative to 100 parts by mass of manganese dioxide.

Hereinafter, description will be made with reference to the drawings. In each drawing, in order to clarify the shape or characteristics of each component of the battery, dimensions of the components are illustrated relatively. These dimensions are not necessarily expressed in the same scale ratio. Here, FIG. 1 is a schematic side view illustrating an example of a first positive electrode pellet obtained by a first step in a method for manufacturing an alkaline dry battery according to an exemplary embodiment of the present invention.

First pellet 100 illustrated in FIG. 1 has a hollow cylindrical shape and includes first end fam E1 and second end face E2 opposite to first end face E1 along the axis. First pellet 100 includes tapered part T whose outer diameter decreases from D2 to D1 from second end face E2 toward first end fac E1. Furthermore, in a cross section along the axis of first pellet 100 (as viewed from a side surface of first pellet 100 illustrated in FIG. 1), the inclination angle θ of tapered part T with respect to an axis of first pellet 100 ranges from 0.26° to 0.87°, inclusive. In first pellet 100, tapered part T is provided from second end face E2 to first end fac E1 (on the entire side surface of first pellet 100).

A size of the battery is not particularly limited, and may be any size. For example, in the case of an AA battery, a height Hof first pellet 100 (tapered part T) ranges, for example, from 10.60 mm to 22.10 mm, inclusive. Furthermore, the outer diameter D2 of first pellet 100 ranges, for example, from 13.60 mm to 13.76 mm, inclusive. Furthermore, in first pellet 100, a ratio of the outer diameter D2 to the outer diameter D1:D2/D1 ranges, for example, from 1.01 to 1.05, inclusive.

In the case of an AAA battery, a height Hof first pellet 100 (tapered part T) ranges, for example, from 8.91 mm to 18.53 mm, inclusive. Furthermore, the outer diameter D2 of first pellet 100 ranges, for example, 10.10 mm to 10.25 mm, inclusive. Furthermore, in first pellet 100, a ratio of the outer diameter D2 to the outer diameter D1:D2/D1 ranges, for example, from 1.01 to 1.03, inclusive.

In the case of a single battery, a height H of first pellet 100 (tapered part T) ranges, for example, from 24.35 mm to 49.40 mm, inclusive. Furthermore, the outer diameter D2 of first pellet 100 ranges, for example, from 32.00 mm to 32.36 mm, inclusive. Furthermore, in first pellet 100, a ratio of the outer diameter D2 to the outer diameter D1:D2/D1 is, for example, about 1.01.

In the case of a C battery, a height Hof first pellet 100 (tapered part T) ranges, for example, from 19.55 mm to 39.80 mm, inclusive. Furthermore, the outer diameter D2 of first pellet 100 ranges, for example, from 24.40 mm to 24.66 mm, inclusive. Furthermore, in first pellet 100, a ratio of the outer diameter D2 to the outer diameter D1:D2/D1 is, for example, about 1.01.

Figure 2:
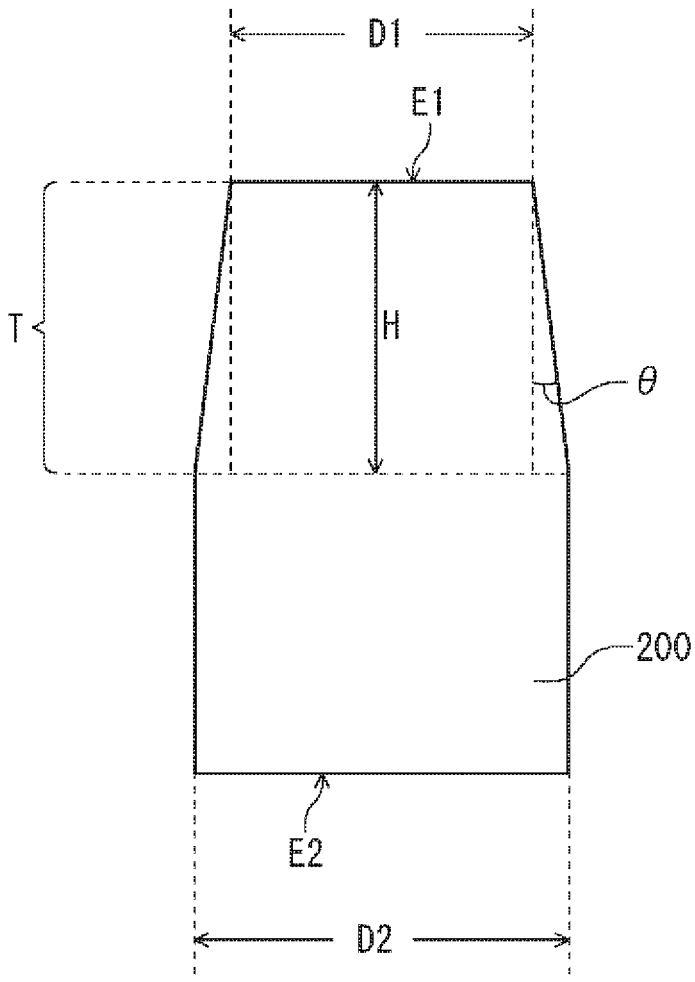
FIG. 2 is a schematic side view illustrating another example of the first positive electrode pellet obtained by the first step of the method for manufacturing an alkaline dry battery according to an exemplary embodiment of the present invention.

FIG. 2 is a schematic side view illustrating another example of a first positive electrode pellet obtained by a first step in a method for manufacturing an alkaline dry battery according to an exemplary embodiment of the present invention. Note that in FIG. 2, the description of the configuration overlapping with first pellet 100 in FIG. 1 is omitted.

In first pellet 200 illustrated in FIG. 2, tapered part T is provided in apart of first pellet 200 near first end face E1 (a side surface region from the first end face to the middle of the first end face and the second end face). A height H, an outer diameter D2, and D1/D2 of the tapered part of first pellet 200 in FIG. 2 may be in ranges exemplified by the height H, the outer diameter D2, and D1/D2 of the tapered part of first pellet 100 in FIG. 1 described above.

(Second Step)

In a second step, a hollow cylindrical positive electrode pellet group including the first positive electrode pellet is inserted into a bottomed cylindrical case to obtain a hollow cylindrical positive electrode inscribed in the case. For example, a nickel-plated steel plate is used for the case. In order to improve adhesion between the positive electrode and the case, the inner surface of the case may be coated with a carbon film.

The positive electrode pellets (Hereinafter, the positive electrode pellets are simply referred to as other positive electrode pellets.) other than the first positive electrode pellet in the positive electrode pellet group can also be produced by pressure-molding the positive electrode mixture in the same manner as the first positive electrode pellet. The other positive electrode pellets may be different in shape and size from the first positive electrode pellet, but preferably have substantially the same shape and size as the first positive electrode pellet from the viewpoint of productivity. A direction in which the other positive electrode pellets are inserted into the case is not particularly limited, but from the viewpoint of productivity, in a case where the positive electrode pellets have substantially the same shape and size, it is preferable to stack the positive electrode pellets by disposing the positive electrode pellets such that the first end faces of the positive electrode pellets face the opening of the case. The number of positive electrode pellets included in the positive electrode pellet group ranges, for example, from 2 to 4, inclusive. In a case where the positive electrode pellets have substantially the same shape and size, an error such as length dimensions (for example, height dimensions) of the positive electrode pellets is, for example, about 3% or less. The above error is, with respect to an average value for the length dimension and the like of each positive electrode pellet, a ratio of a difference (absolute value) between a value farthest from the average value and the average value.

Figure 3:
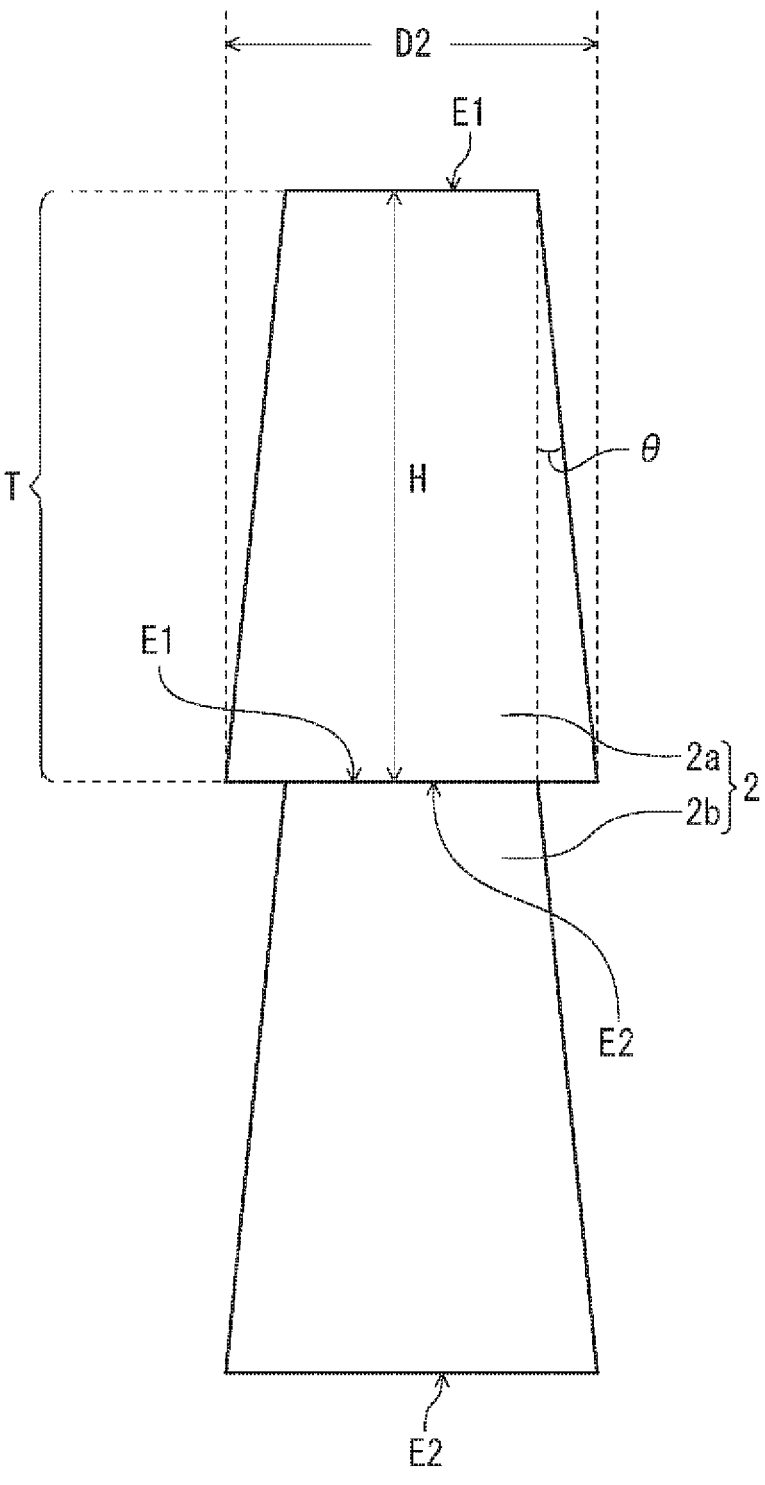
FIG. 3 is a schematic side view illustrating an example of a positive electrode pellet group inserted into a casein a second step of the method for manufacturing an alkaline dry battery according to an exemplary embodiment of the present invention.
Figure 4:
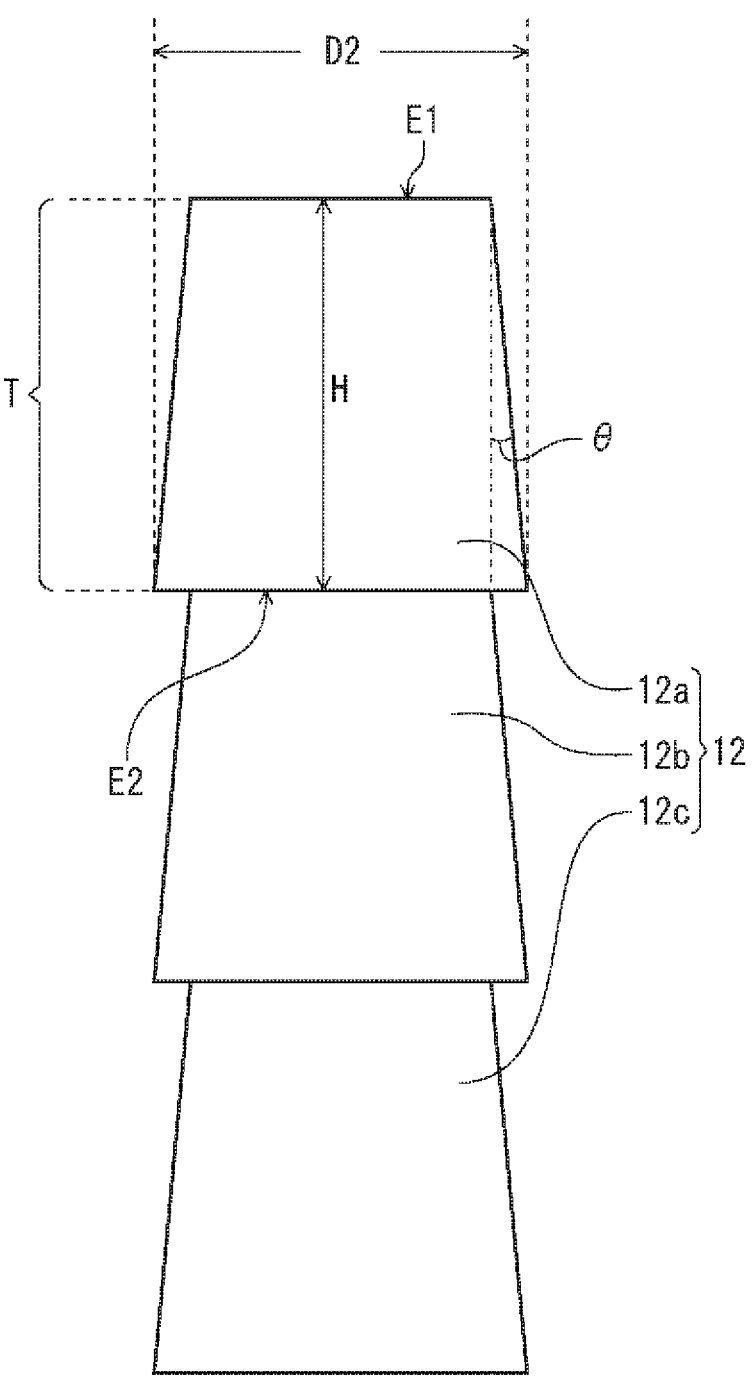
FIG. 4 is a schematic side view illustrating another example of the positive electrode pellet group inserted into the case in the second step of the method for manufacturing an alkaline dry battery according to an exemplary embodiment of the present invention.
Figure 5:
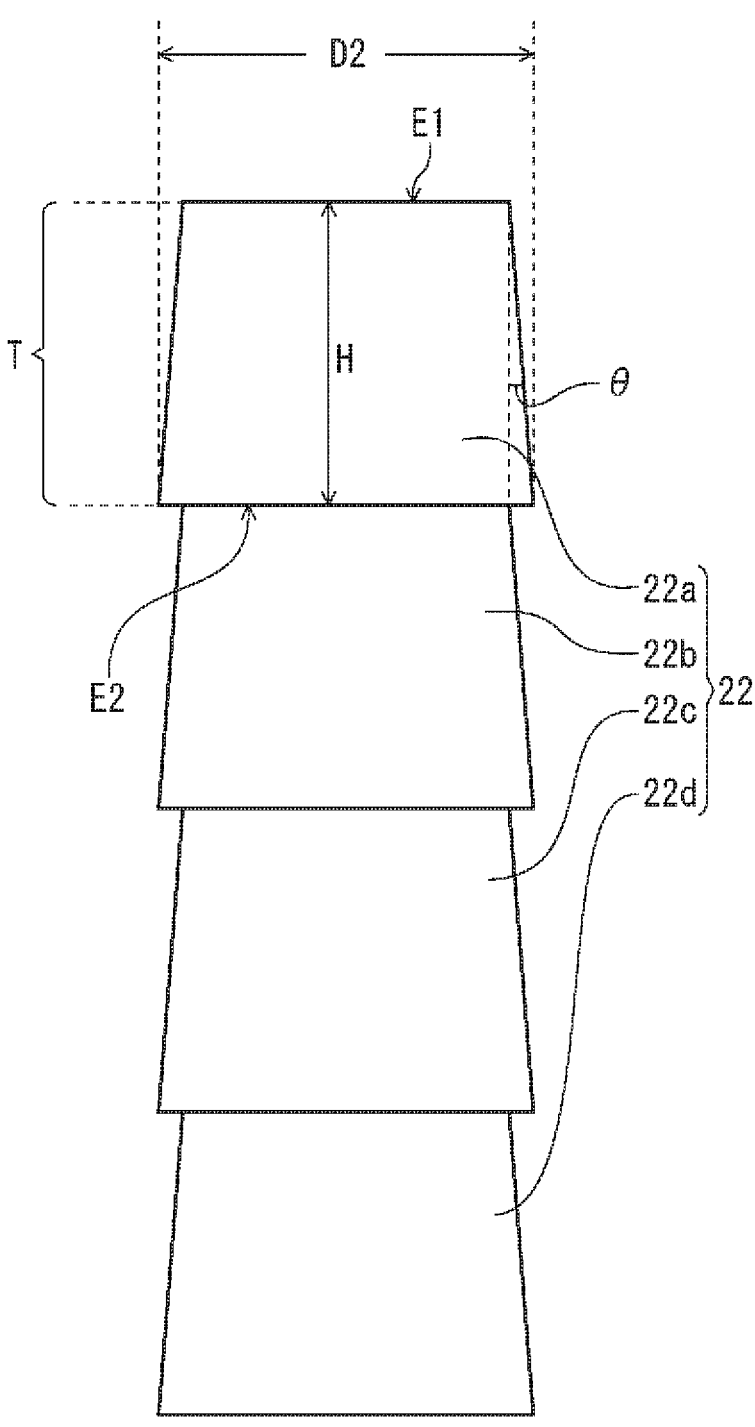
FIG. 5 is a schematic side view illustrating still another example of the positive electrode pellet group inserted into the case in the second step of the method for manufacturing an alkaline dry battery according to an exemplary embodiment of the present invention.

Here, FIGS. 3 to 5 are schematic side views illustrating three examples of a positive electrode pellet group (stack) constituting the positive electrode. In FIGS. 3 to 5, in order to illustrate the tapered part, for convenience, a state before the stack is inserted into the case is illustrated.

Positive electrode 2 illustrated in FIG. 3 includes a stack of hollow cylindrical first pellet 2a and second pellet 2b.

First pellet 2a has first end face E1 and second end face E2 opposite to first end face E1 along the axis. First pellet 2a includes tapered part T whose outer diameter decreases from second end face E2 toward first end face E1. Furthermore, in the cross section along the axis of first pellet 2a (as viewed from the side surface of first pellet 2a illustrated in FIG. 3), the inclination angle θ of tapered part T with respect to the axis of first pellet 2a ranges from 0.26° to 0.87°, inclusive. In first pellet 2a, tapered part T is provided from second end face E2 to first end face E1 (on the entire side surface of first pellet 2a). Second pellet 2b has substantially the same shape and size as first pellet 2a.

Each of pellets 2a, 2b is inserted into the case such that first end face E1 faces the opening of the case. First pellet 2a and second pellet 2b are disposed in order from the opening of the case. That is, first pellet 2a is disposed closest to opening of the case such that first end face E1 faces the opening of the case.

In FIG. 3, the second pellet has substantially the same shape and size as the first pellet, but is not limited thereto, and may be different in shape and size from the first pellet. The second pellet may not include tapered part T. Furthermore, in FIG. 3, the second pellet is disposed such that first end face E1 faces the opening of the case, but may be disposed such that second end face E2 faces the opening of the case.

FIG. 3 illustrates a case where the two pellets having substantially the same shape and size are stacked to constitute the positive electrode, but the positive electrode is not limited thereto. As illustrated in FIG. 4, three pellets (first pellet 12a to third pellet 12c) having substantially the same shape and size may be stacked to constitute positive electrode 12. Furthermore, as illustrated in FIG. 5, four pellets (first pellet 22a to fourth pellet 22d) having substantially the same shape and size may be stacked to constitute positive electrode 22.

(Third Step)

In a third step, for example, a grooving roller is pressed against a predetermined part (near an opening end) of a side part of the case while rotating the case about an axial center to push up the predetermined part toward the axis. In this manner, an annular groove is provided in a region of the side part of the case near the opening with respect to the positive electrode. A depth of the groove can be controlled by adjusting a shape of the grooving roller, a load when the groove is pushed up toward the axis, a push-up height, and the like.

Figure 6:
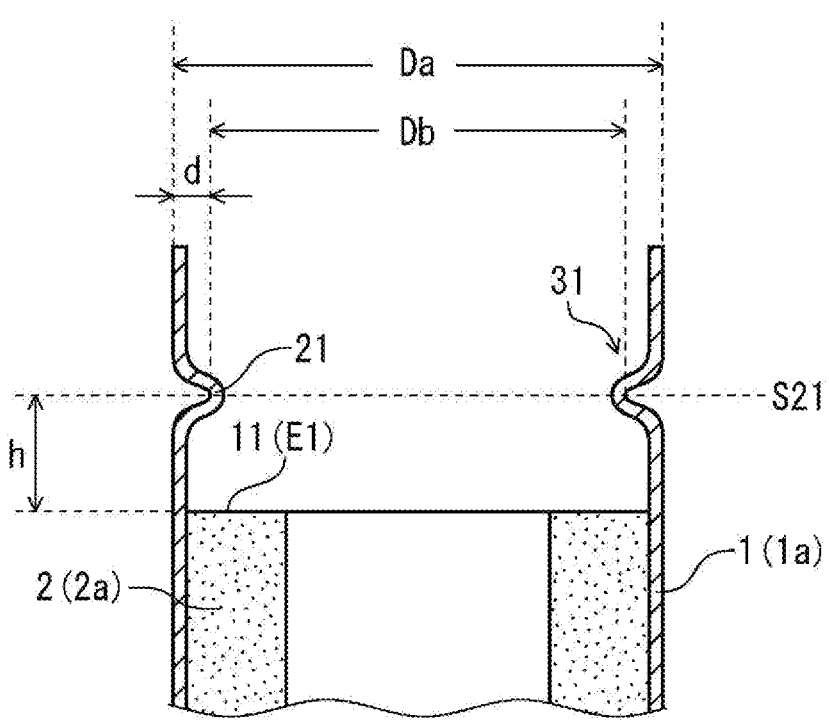
FIG. 6 is a cross-sectional view of a main part illustrating a state in which an annular groove is provided on a side part of a case in which a positive electrode is inscribed by a third step of the method for manufacturing an alkaline dry battery according to an exemplary embodiment of the present invention.

Here, FIG. 6 is a cross-sectional view of a main part illustrating a state in which the annular groove is provided on the side part of the case in which the positive electrode is inscribed by the third step in the method for manufacturing an alkaline dry battery according to an exemplary embodiment of the present invention.

Hollow cylindrical positive electrode 2 is inscribed in case 1. In positive electrode 2, first pellet 2a including tapered part T is disposed closest to opening of case 1 such that first end face E1 faces the opening of case 1. An inclination angle θ of tapered part T ranges from 0.26° to 0.87°, inclusive. Annular groove 21 is provided in a region of side part 1a of case 1 closer to the opening than positive electrode 2. Groove 21 (virtual plane S21 including the deepest part of annular groove 21) is provided at a distance h in a range from 0.55 mm to 2.35 mm, inclusive, from end face 11 of positive electrode 2 near the opening of case 1 (first end face E1 of first pellet 2a). In this case, impact transmitted to the end of positive electrode 2 near the opening of case 1 at the time of forming groove 21 is reduced, and the occurrence of cracking of positive electrode 2 due to the form of groove 21 is suppressed.

A depth d of groove 21 (deepest part) preferably ranges from 0.3 mm to 2.2 mm, inclusive. In a case where the depth d of the groove is 0.3 mm or more, a stepped part is sufficiently formed by the groove, a sealing unit is easily placed on the stepped part, and the reliability of the sealing performance of the battery is easily improved. In a case where the depth d of the groove is 2.2 mm or less, the occurrence of a crack in the positive electrode is suppressed. The depth d of groove 21 can be obtained by measuring an outer diameter Da of the side part 1a of the case at apart other than groove 21 and an outer diameter db of the side part 1a of the case at the deepest part of groove 21 by an equation (Da−db)/2. In the case of a battery (finished product), the outer diameter Da and the outer diameter db may be measured using the side part of the case when the battery is viewed from a side surface.

In FIG. 6, positive electrode 2 of FIG. 3 is accommodated in case 1, but the positive electrode is not limited thereto. For example, positive electrode 12 of FIG. 4 or positive electrode 22 of FIG. 5 may be used.

(Fourth Step and Fifth Step)

Moreover, the above manufacturing method may include a fourth step of disposing a negative electrode in a hollow portion of the positive electrode with a separator interposed between the positive electrode and the negative electrode, and injecting an electrolyte solution into the case, and a fifth step of disposing a sealing unit on a stepped part (stepped part 31 provided by groove 21 in FIG. 6) provided by the groove of the case, and sealing the opening of the case with the sealing unit.

[Alkaline Dry Battery]

An alkaline dry battery according to an exemplary embodiment of the present invention includes a bottomed cylindrical case including a groove, a hollow cylindrical positive electrode inscribed in the case in a region near a bottom than the groove of the case, a negative electrode disposed in a hollow portion of the positive electrode, a separator disposed between the positive electrode and the negative electrode, and an electrolyte solution. Furthermore, the alkaline dry battery described above includes a sealing unit disposed on a stepped part provided by the groove of the case and sealing an opening of the case. A distance h between the groove and an end fame of the positive electrode near the groove (near the opening of the case) ranges from 0.55 mm to 2.35 mm, inclusive.

When the alkaline dry battery is disassembled to expose the positive electrode from the case to the outside (when the positive electrode is not inscribed in the case), the tapered part (inclination angle θ) provided on an outer peripheral surface of the positive electrode (stack) substantially returns to a state before insertion into the case. That is, the positive electrode taken out from the inside of the case includes a tapered part whose outer diameter decreases from the bottom toward the groove of the case, and in a cross section along the axis of the positive electrode, an inclination angle θ of the tapered part with respect to the axis of the positive electrode ranges from 0.26° to 0.87°, inclusive.

The negative electrode is disposed in the hollow portion of the pellet of the positive electrode. The negative electrode has a gel-like form. The negative electrode usually contains zinc or zinc alloy powder as a negative electrode active material, an electrolyte solution, and a gelling agent. As the electrolyte solution, an electrolyte solution contained in the positive electrode pellet group can be used.

The zinc alloy preferably contains at least one selected from the group consisting of indium, bismuth, and aluminum from the viewpoint of corrosion resistance. The negative electrode active material is usually used in a powdery form. From the viewpoint of the filling property of the negative electrode and the diffusibility of the alkaline electrolyte solution in the negative electrode, an average particle diameter (D50) of the negative electrode active material powder ranges, for example, from 80 µm to 200 µm, inclusive, and preferably ranges from 100 µm to 150 µm, inclusive. The content of zinc or zinc alloy powder in the negative electrode ranges, for example, from 170 parts by mass to 220 parts by mass, inclusive, per 100 parts by mass of the electrolyte solution.

As the gelling agent, a known gelling agent used in the field of alkaline dry batteries is used without particular limitation, and for example, a thickener and/or a water-absorbent polymer can be used. Examples of such a gelling agent include polyacrylic acid and sodium polyacrylate. The content of the gelling agent in the negative electrode ranges, for example, from 0.5 parts by mass to 2 parts by mass, inclusive, per 100 parts by mass of the negative electrode active material.

As the separator, for example, a nonwoven fabric or a microporous membrane is used. Examples of a material of the separator include cellulose and polyvinyl alcohol. As the nonwoven fabric, for example, one mainly composed of fibers of these materials is used. As the microporous membrane, cellophane or the like is used. A thickness of the separator ranges, for example, from 80 µm to 300 µm, inclusive. The separator may be formed by stacking a plurality of sheets (nonwoven fabric or the like) so that the thickness falls within the above range.

Hereinafter, an alkaline dry battery according to the present invention will be described in detail with reference to the drawing. Note that the present invention is not limited to the following exemplary embodiment. Furthermore, modifications can be made as appropriate without departing from the scope in which the effects of the present invention are exhibited. Moreover, combinations with other exemplary embodiments are also possible.

Figure 7:
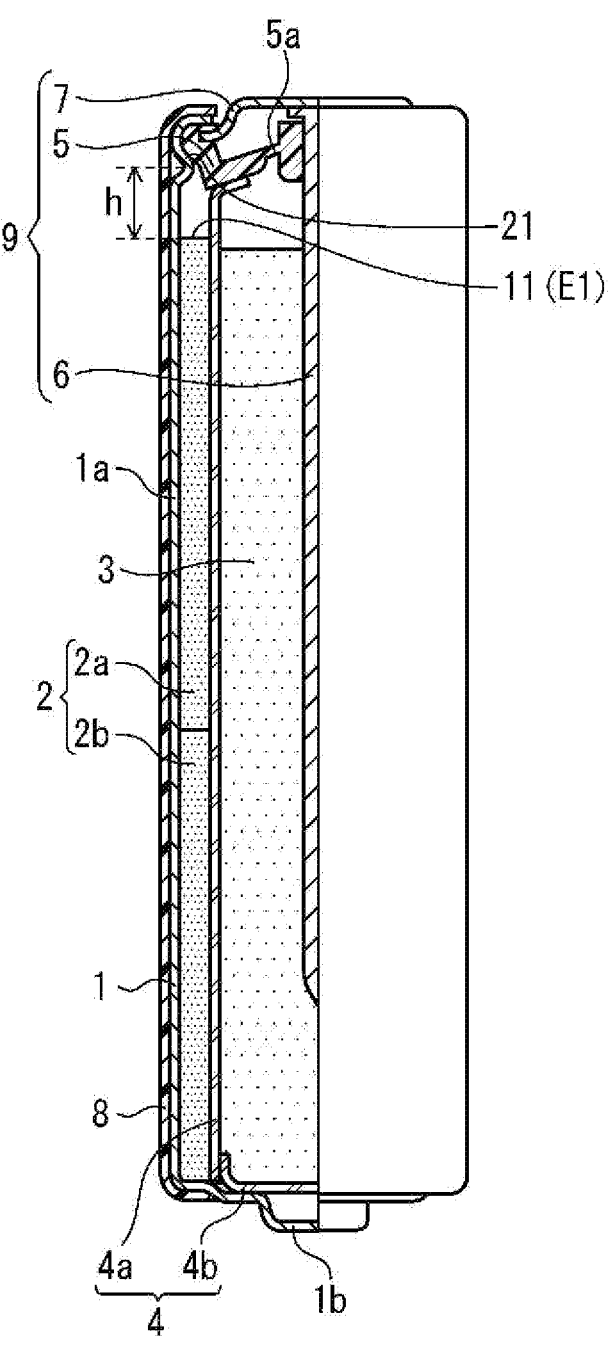
FIG. 7 is a front view of an alkaline dry battery according to an exemplary embodiment of the present invention, in which a horizontal half of the alkaline dry battery is a cross section.

FIG. 7 is a front view of an alkaline dry battery according to an exemplary embodiment of the present invention, in which a horizontal half of the alkaline dry battery is a cross section.

As illustrated in FIG. 7, the alkaline dry battery includes positive electrode 2 having a hollow cylindrical shape, negative electrode 3 disposed in a hollow portion of positive electrode 2, separator 4 disposed between positive electrode 2 and negative electrode 3, and an electrolyte solution (not illustrated), which are accommodated in bottomed cylindrical case 1 having side part 1a and bottom 1b. Bottom 1b of case 1 also serves as a positive electrode terminal. Positive electrode 2 is filled in case 1, and gel-like negative electrode 3 is filed in the hollow portion of positive electrode 2 with separator 4 interposed therebetween.

Positive electrode 2 contains manganese dioxide, and usually also contains a conductive agent. Negative electrode 3 usually contains an alkaline electrolyte solution and a gelling agent in addition to a negative electrode active material containing zinc. Separator 4 has a bottomed cylindrical shape, and includes cylindrical separator 4a and bottom paper 4b. Separator 4a is disposed along an inner surface of the hollow portion of positive electrode 2 to separate positive electrode 2 and negative electrode 3 from each other. Therefore, the separator disposed between the positive electrode and the negative electrode means cylindrical separator 4a. Bottom paper 4b is disposed at a bottom of the hollow portion f positive electrode 2 to separate negative electrode 3 from case 1.

An opening of case 1 is sealed by sealing unit 9. Sealing unit 9 includes gasket 5, negative electrode terminal plate 7 also serving as a negative electrode terminal, and negative electrode current collector 6. Gasket 5 has annular thin part 5a. When an internal pressure of the battery exceeds a predetermined value, thin part 5a breaks and a gas is released to the outside of the battery.

Negative electrode current collector 6 is inserted into negative electrode 3. A material of negative electrode current collector 6 is made of for example, an alloy containing copper and zinc such as brass. Negative electrode current collector 6 may be subjected to plating treatment such as tin plating as necessary. Negative electrode current collector 6 has a nail-like form including ahead and a body, the body is inserted into a through-hole provided in a central tubular part of gasket 5, and the head of negative electrode current collector 6 is welded to a flat portion of a central portion of negative electrode terminal plate 7.

Annular groove 21 is provided in a region of side part 1a of the case closer to the opening with respect to positive electrode 2, and an opening end of case 1 (a region of side part 1a of the case near the opening with respect to groove 21) is caulked to a flange part of a peripheral edge of negative electrode terminal plate 7 via an outer peripheral end of gasket 5. An outer surface of case 1 is covered with exterior label 8. A distance h between end face 11 of positive electrode 2 on a side of groove 21 (first end face E1 of first pellet 2a) and groove 21 (virtual surface S21 including the deepest part of annular groove 21) ranges from 0.55 mm to 2.35 mm, inclusive.

Positive electrode 2 includes a stack of first pellet 2a and second pellet 2b illustrated in FIG. 3. Each of pellets 2a, 2b is press-fitted into case 1 such that first end face E1 faces the opening of case 1, and is in contact with the inner surface of case 1. In a state where the stack is taken out of case 1, the inclination angle $\theta$ of tapered part T of first pellet 2a ranges from 0.260 to 0.87°, inclusive.

In FIG. 7, positive electrode 2 is accommodated in case 1, but the positive electrode is not limited thereto. For example, positive electrode 12 or positive electrode 22 may be used.

In FIG. 7, the separator is formed of cylindrical separator 4a and bottom paper 4b, but is not limited thereto. A bottomed cylindrical integrated body may be used as the separator, and a separator having a known shape used in the field of alkaline dry batteries can be used.

EXAMPLE

Hereinafter, the present invention is specifically described with reference to examples and comparative examples, but the present invention is not limited to the following examples.

Examples 1 to 18 and Comparative Examples 1 to 14

(First Step)

An electrolytic manganese dioxide powder (manganese dioxide purity: 93%, average particle diameter D50: 40 μm, BET specific surface area: 26 m2/g) as a positive electrode active material, a graphite powder as a conductive agent, and polytetrafluoroethylene as an additive were mixed. An electrolyte solution was added to the mixture, and the mixture was sufficiently stirred, then compression-molded into a flake shape, and further pulverized into a granular shape to obtain a positive electrode mixture. A mass ratio of the respective components was electrolytic manganese dioxide powder:graphite powder:electrolyte solution=95:5:2. The additive was used in a ratio of 0.2 mass % based on electrolytic manganese dioxide. As the electrolyte solution, an alkaline aqueous solution containing potassium hydroxide (concentration: 35 mass %) and zinc oxide (concentration: 2 mass %) was used.

The two pellets (first pellet 2a and second pellet 2b) illustrated in FIG. 3 were prepared by pressure-molding the positive electrode mixture using a mold. By adjusting the pressure of the pressure molding at this time, the manganese dioxide density was set to 2.80 g/cm³. The manganese dioxide density of these pellets is a value at the time of preparing the pellets. The manganese dioxide density of the prepared pellets was determined by dividing a mass of manganese dioxide calculated from the raw material composition by a volume calculated from the pellet size. For each pellet, the inclination angle $\theta$ of tapered part T was set to values shown in Tables 1 to 3, the outer diameter D2 (maximum outer diameter) of second end face E2 was set to 13.70 mm, the height H of the pellet (tapered part) was set to 21.80 mm, and the inner diameter (diameter of the hollow portion) was set to 8.90 mm.

(Second Step)

Next, the two pellets (stack illustrated in FIG. 3) obtained above were disposed so that first end face E1 faced the opening of the case, and inserted into the case (inner diameter: 13.70 mm). In this way, a positive electrode inscribed in the case was obtained. As the case, a carbon film having a thickness of about 10 μm was formed by applying Bannyheight manufactured by Nippon Graphite Co., Ltd to the inner surface of a bottomed cylindrical case (body portion thickness: 0.15 mm) made of a nickel-plated steel plate.

(Third Step)

An annular groove was provided in a region of the side part of the case on the opening side with respect to the positive electrode. At this time, a position where the groove was provided was adjusted so that the distance h from the end face of the positive electrode on the opening side of the case (first end face of the first pellet) was a value shown in Tables 1 to 3. Furthermore, the depth d of the groove was set to values shown in Tables 1 to 3.

Positive electrodes obtained in Examples 1 to 18 and Comparative Examples 1 to 14 and inscribed in the case provided with the groove was evaluated as follows.

[Evaluation: Cracking Occurrence Rate of Positive Electrodes]

Each 10 positive electrodes inscribed in the case provided with the groove were produced, and the presence or absence of cracking of the positive electrodes (a phenomenon in which cracking occurs from the peripheral edge of the end face of the positive electrode near the opening of the case to the inside) was visually confirmed. The number of positive electrodes in which cracking occurred among the 10 positive electrodes was counted, and a cracking occurrence rate of the positive electrodes was determined. The evaluation results are shown in Tables 1 to 3.

TABLE 1

| | Number of pellets to be inserted into case (pieces) | Inclination angle $\theta$ (°) of tapered part | Distance h (mm) between groove and first end face of first pellet | Value (mm) obtained by subtracting case inner diameter from maximum outer diameter of first pellet | Depth d (mm) of groove | Cracking occurrence rate (%) of positive electrodes |
|---|---|---|---|---|---|---|
| Comparative Example 1 | 2 | 0.2 | 0.35 | 0 | 0.3 | 20 |
| Comparative Example 2 | 2 | 0.2 | 0.55 | 0 | 0.3 | 20 |
| Comparative Example 3 | 2 | 0.2 | 1.35 | 0 | 0.3 | 10 |

TABLE 1-continued

| | Number of pellets to be inserted into case (pieces) | Inclination angle θ (°) of tapered part | Distance h (mm) between groove and first end face of first pellet | Value (mm) obtained by subtracting case inner diameter from maximum outer diameter of first pellet | Depth d (mm) of groove | Cracking occurrence rate (%) of positive electrodes |
|---|---|---|---|---|---|---|
| Comparative Example 4 | 2 | 0.2 | 2.35 | 0 | 0.3 | 10 |
| Comparative Example 5 | 2 | 0.2 | 0.35 | 0 | 1.5 | 30 |
| Comparative Example 6 | 2 | 0.2 | 0.55 | 0 | 1.5 | 20 |
| Comparative Example 7 | 2 | 0.2 | 1.35 | 0 | 1.5 | 10 |
| Comparative Example 8 | 2 | 0.2 | 2.35 | 0 | 1.5 | 10 |
| Comparative Example 9 | 2 | 0.2 | 0.35 | 0 | 2.2 | 80 |
| Comparative Example 10 | 2 | 0.2 | 0.55 | 0 | 2.2 | 40 |
| Comparative Example 11 | 2 | 0.2 | 1.35 | 0 | 2.2 | 30 |
| Comparative Example 12 | 2 | 0.2 | 2.35 | 0 | 2.2 | 20 |

TABLE 2

| | Number of pellets to be inserted into case (pieces) | Inclination angle θ (°) of tapered part | Distance h (mm) between groove and first end face of first pellet | Value (mm) obtained by subtracting case inner diameter from maximum outer diameter of first pellet | Depth d (mm) of groove | Cracking occurrence rate (%) of positive electrodes |
|---|---|---|---|---|---|---|
| Example 2 | 2 | 0.26 | 0.55 | 0 | 0.3 | 0 |
| Example 3 | 2 | 0.26 | 1.35 | 0 | 0.3 | 0 |
| Example 4 | 2 | 0.26 | 2.35 | 0 | 0.3 | 0 |
| Comparative Example 13 | 2 | 0.26 | 0.35 | 0 | 1.5 | 10 |
| Example 5 | 2 | 0.26 | 0.55 | 0 | 1.5 | 0 |
| Example 6 | 2 | 0.26 | 1.35 | 0 | 1.5 | 0 |
| Example 7 | 2 | 0.26 | 2.35 | 0 | 1.5 | 0 |
| Comparative Example 14 | 2 | 0.26 | 0.35 | 0 | 2.2 | 20 |
| Example 1 | 2 | 0.26 | 0.55 | 0 | 2.2 | 0 |
| Example 8 | 2 | 0.26 | 1.35 | 0 | 2.2 | 0 |
| Example 9 | 2 | 0.26 | 2.35 | 0 | 2.2 | 0 |

TABLE 3

| | Number of pellets to be inserted into case (pieces) | Inclination angle θ (°) of tapered part | Distance h (mm) between groove and first end face of first pellet | Value (mm) obtained by subtracting case inner diameter from maximum outer diameter of first pellet | Depth d (mm) of groove | Cracking occurrence rate (%) of positive electrodes |
|---|---|---|---|---|---|---|
| Example 10 | 2 | 0.87 | 0.55 | 0 | 0.3 | 0 |
| Example 11 | 2 | 0.87 | 1.35 | 0 | 0.3 | 0 |
| Example 12 | 2 | 0.87 | 2.35 | 0 | 0.3 | 0 |
| Comparative Example 13 | 2 | 0.87 | 0.55 | 0 | 1.5 | 0 |
| Example 14 | 2 | 0.87 | 1.35 | 0 | 1.5 | 0 |
| Example 15 | 2 | 0.87 | 2.35 | 0 | 1.5 | 0 |
| Example 16 | 2 | 0.87 | 0.55 | 0 | 2.2 | 0 |
| Example 17 | 2 | 0.87 | 1.35 | 0 | 2.2 | 0 |
| Example 18 | 2 | 0.87 | 2.35 | 0 | 2.2 | 0 |

In Example 1 to 18, the cracking occurrence rate of the positive electrodes was 00%. In Comparative Examples 1 to 12 using the positive electrode pellets in which the inclination angle of the tapered part was 0.20°, cracking was observed in the positive electrodes. In Comparative Examples 13 and 14 in which the inclination angle of the tapered part was 0.26° and the distance h between the groove and the first end face was 0.35 mm, cracking was observed in the positive electrodes.

Example 19

In the first step, three pellets (first pellet 12a to third pellet 12c illustrated in FIG. 4) having substantially the same shape and size were prepared. For each pellet, the inclination angle θ of the tapered part was set to 0.26°, the outer diameter D2 (maximum outer diameter) of second end face E2 was set to 13.70 mm, and the height H of the pellet (tapered part) was set to 14.53 mm.

In the second step, the three pellets (stack illustrated in FIG. 4) obtained as described above were arranged such that first end face E1 faced the opening of the case, and inserted into the case. In this way, a positive electrode inscribed in the case was obtained.

A positive electrode inscribed in the case provided with the groove was produced and evaluated by the same method as in Example 1 except for the above.

Example 20

In the first step, four pellets (first pellet 22*a* to fourth pellet 22*d* illustrated in FIG. 5) having substantially the same shape and size were prepared. For each pellet, the inclination angle θ of the tapered part was 0.26°, the outer diameter D2 (maximum outer diameter) of second end face E2 was 13.70 mm, and the height H of the pellet (tapered part) was 10.90 mm.

In the second step, the four pellets (stack illustrated in FIG. 5) obtained as described above were arranged such that first end face E1 faced the opening of the case, and inserted into the case. In this way, a positive electrode inscribed in the case was obtained.

A positive electrode inscribed in the case provided with the groove was produced and evaluated by the same method as in Example 1 except for the above.

Example 21

In the first step, five pellets (first to fifth pellets) having substantially the same shape and size were prepared. Each pellet had a shape illustrated in FIG. 1, the inclination angle θ of tapered part T was 0.26°, the outer diameter D2 (maximum outer diameter) of second end face E2 was 13.70 mm, and the height H of the pellet (tapered part) was 8.70 mm.

In the second step, the five pellets (stack) obtained as described above were arranged such that first end face E1 faced the opening of the case, and inserted into the case. In this way, a positive electrode inscribed in the case was obtained.

The evaluation results of Examples 19 to 21 are illustrated in Table 4.

In Examples 19 and 20, similarly to Example 1, the cracking occurrence rate of the positive electrodes was 0%.

Examples 22 to 24

In the first step, for the first pellet and the second pellet, the outer diameter D1 of first end face E1 and the outer diameter D2 of second end face E2 were changed without changing the inclination angle θ such that the value obtained by subtracting the case inner diameter from the maximum outer diameter (the outer diameter D2 of second end face E2) of each pellet was a value shown in Table 5. A positive electrode inscribed in the case provided with the groove was produced by the same method as in Example 1 except for the above.

Examples 25 to 27

A positive electrode inscribed in the case provided with the groove was produced by the same method as in Example 1 except that the depth d of the groove provided in the case in the third step was set to a value shown in Table 6.

The cracking occurrence rate of the positive electrode was determined for the positive electrode obtained in Examples 22 to 27 and inscribed in the case provided with the groove. Furthermore, the following evaluations were also performed for Examples 1 and 22 to 27.

[Evaluation: Crack occurrence rate of positive electrodes] 10 positive electrodes inscribed in the case provided with the groove were manufactured, and the presence or absence of a crack of the positive electrode (phenomenon in which the peripheral edge of the end face of the positive electrode near the opening of the case is thinly peeled in a ring shape) was confirmed by an X-ray transmission image. The number of positive electrodes in which cracks occurred among the 10 positive electrodes was counted, and a crack occurrence rate of the positive electrodes was determined.

TABLE 4

| | Number of pellets to be inserted into case (pieces) | Inclination angle θ (°) of tapered part | Distance h (mm) between groove and first end face of first pellet | Value (mm) obtained by subtracting case inner diameter from maximum outer diameter of first pellet | Depth d (mm) of groove | Cracking occurrence rate (%) of positive electrodes |
|---|---|---|---|---|---|---|
| Example 1 | 2 | 0.26 | 0.55 | 0 | 2.2 | 0 |
| Example 19 | 3 | 0.26 | 0.55 | 0 | 2.2 | 0 |
| Example 20 | 4 | 0.26 | 0.55 | 0 | 2.2 | 0 |
| Example 21 | 5 | 0.26 | 0.55 | 0 | 2.2 | 20 |

The evaluation results are shown in Tables 5 and 6.

TABLE 5

| | Number of pellets to be inserted into case (pieces) | Inclination angle θ (°) of tapered part | Distance h (mm) between groove and first end face of first pellet | Value (mm) obtained by subtracting case inner diameter from maximum outer diameter of first pellet | Depth d (mm) of groove | Cracking occurrence rate (%) of positive electrodes | Crack occurrence rate (%) of positive electrodes |
|---|---|---|---|---|---|---|---|
| Example 1 | 2 | 0.26 | 0.55 | 0 | 2.2 | 0 | 0 |
| Example 22 | 2 | 0.26 | 0.55 | 0.03 | 2.2 | 0 | 0 |
| Example 23 | 2 | 0.26 | 0.55 | 0.06 | 2.2 | 0 | 0 |
| Example 24 | 2 | 0.26 | 0.55 | 0.08 | 2.2 | 0 | 20 |

TABLE 6

| | Number of pellets to be inserted into case (pieces) | Inclination angle θ (°) of tapered part | Distance h (mm) between groove and first end face of first pellet | Value (mm) obtained by subtracting case inner diameter from maximum outer diameter of first pellet | Depth d (mm) of groove | Cracking occurrence rate (%) of positive electrodes | Crack occurrence rate (%) of positive electrodes |
|---|---|---|---|---|---|---|---|
| Example 25 | 2 | 0.26 | 0.55 | 0 | 0.3 | 0 | 0 |
| Example 26 | 2 | 0.26 | 0.55 | 0 | 1.9 | 0 | 0 |
| Example 1 | 2 | 0.26 | 0.55 | 0 | 2.2 | 0 | 0 |
| Example 27 | 2 | 0.26 | 0.55 | 0 | 2.4 | 0 | 20 |

In all of Examples 22 to 27, the cracking occurrence rate of the positive electrodes was 0%, as in Example 1. In particular, in Examples 1, 22 and 23, and 25 and 26, the crack occurrence rate of the positive electrodes was also 0%.

INDUSTRIAL APPLICABILITY

The alkaline dry battery according to the exemplary embodiments of the present invention is advantageous in increasing the capacity and improving the reliability, and thus can be suitably used as a power supply of an electronic device such as a portable device.

REFERENCE MARKS IN THE DRAWINGS 1 case
1a side part
1b bottom
2, 12, 22 positive electrode
2a, 12a, 22a, 100, 200 first pellet
2b, 12b, 22b second pellet
12c, 22c third pellet
22d fourth pellet
3 negative electrode
4 separator
4a cylindrical separator
4b bottom paper
5 gasket
6 negative electrode current collector
7 negative electrode terminal plate
8 exterior label
9 sealing unit
11 end face of positive electrode near groove
21 groove
31 stepped part
E1 first end face
E2 second end face
S21 virtual plane including deepest part of annular groove

The invention claimed is:

1. A method for manufacturing an alkaline dry battery, the method comprising:
   a first step of preparing a first positive electrode pellet including a hollow cylindrical shape and including a first end face and a second end face opposite to the first end face along an axis of the first positive electrode pellet;
   a second step of inserting a hollow cylindrical positive electrode pellet group including the first positive electrode pellet into a case having a bottomed cylindrical shape to constitute a positive electrode inscribed in the case, the positive electrode including a hollow cylindrical shape; and
   a third step of providing a groove in a region of a side part of the case closer an opening with respect to the positive electrode, the groove being annular,
   wherein
   the first positive electrode pellet includes a tapered part whose outer diameter decreases from the second end face toward the first end face, and in a cross section along the axis of the first positive electrode pellet, an inclination angle of the tapered part with respect to an axis of the first positive electrode pellet ranges from 0.26° to 0.87°, inclusive,
   in the second step, the first positive electrode pellet is disposed closest to the opening of the case, the first end face facing the opening of the case, and
   a distance between the groove and the first end face ranges from 0.55 mm to 2.35 mm, inclusive.

2. The method for manufacturing an alkaline dry battery according to claim 1, wherein a value obtained by subtracting an inner diameter of the case from a maximum outer diameter of the first positive electrode pellet ranges from 0 mm to 0.06 mm, inclusive.

3. The method for manufacturing an alkaline dry battery according to claim 1, wherein a depth of the groove ranges from 0.3 mm to 2.2 mm, inclusive.

4. The method for manufacturing an alkaline dry battery according to claim 1, further comprising:
   a fourth step of disposing a negative electrode in a hollow portion of the positive electrode with a separator interposed between the positive electrode and the negative electrode, and injecting an electrolyte solution into the case; and a fifth step of disposing a sealing unit on a stepped part provided by the groove of the case, and sealing an opening of the case with the sealing unit.

5. An alkaline dry battery comprising: a case including a groove including a bottomed cylindrical shape; a positive electrode including a hollow cylindrical shape inscribed in the case in a region near a bottom of the groove of the case; a negative electrode disposed in a hollow portion of the positive electrode; a separator disposed between the positive electrode and the negative electrode; an electrolyte solution; and a sealing unit disposed on a stepped part provided by the groove of the case and sealing an opening of the case, wherein a distance between the groove and an end face of the positive electrode near a groove ranges from 0.55 mm to 2.35 mm, inclusive, and the positive electrode includes a tapered part whose outer diameter decreases from a bottom of the case toward the groove, and in a cross section along an axis of the positive electrode, an inclination angle of the tapered part with respect to an axis of the positive electrode ranges from 0.26° to 0.87°, inclusive.

* * * * *